United States Patent [19]

Boden

[11] Patent Number: 5,572,770

[45] Date of Patent: Nov. 12, 1996

[54] SELF LOCKING CORD LOCK

[76] Inventor: Robert O. Boden, 1580 Gaywood Dr., Altadena, Calif. 91001

[21] Appl. No.: 516,999

[22] Filed: Aug. 18, 1995

[51] Int. Cl.$^6$ .................................................. F16G 11/04
[52] U.S. Cl. .................................... 24/136 R; 24/712.5
[58] Field of Search ........................... 24/115 G, 115 M, 24/712.5, 115 H, 136 R; 403/298, 329, 326, 290, 211, 374

[56] References Cited

U.S. PATENT DOCUMENTS

| | | |
|---|---|---|
| 3,132,390 | 5/1964 | Boden . |
| 3,845,575 | 11/1974 | Boden . |
| 3,861,003 | 1/1975 | Boden . |
| 3,965,544 | 6/1976 | Boden . |
| 4,035,877 | 7/1977 | Brownson et al. . |
| 4,156,574 | 5/1979 | Boden . |
| 4,288,891 | 9/1981 | Boden . |
| 4,665,590 | 5/1987 | Udelhofen et al. ................ 24/712.5 X |
| 5,454,140 | 10/1995 | Murai ................................ 24/115 H X |

FOREIGN PATENT DOCUMENTS 808924  12/1951  Germany ................................ 403/211

OTHER PUBLICATIONS

"Photograph No. 1".
"Photograph No. 2".

*Primary Examiner*—Peter M. Cuomo
*Assistant Examiner*—Hanh Tran
*Attorney, Agent, or Firm*—William P. Green

[57] ABSTRACT

A self locking cord lock including a cage containing a passage through which a cord or cords can extend, a slide body movable within the cage between a locking position for retaining the cord or cords against movement in a predetermined first direction and a released position permitting such movement, and a spring yieldingly urging the slide body in that direction relative to the cage and toward locking position, with the slide body having a handle portion projecting in the opposite direction beyond the spring and to the exterior of the cage and which is adapted to be pulled by a user to move the slide body in that opposite direction to released position. The spring is preferably molded integrally with the slide body, having a first end attached to the slide body and a second free end bearing yieldingly against a shoulder on the cage. The spring arm may be bowed laterally through an opening in a wall of the cage and then back into the cage and into an opening formed in the slide body.

24 Claims, 2 Drawing Sheets

SELF LOCKING CORD LOCK

This invention relates to improved cord locking devices, for retaining a cord or cords against longitudinal movement in a predetermined direction relative to the device.

BACKGROUND OF THE INVENTION

The devices of the present invention are of a general type including a cage or body containing a passage through which a cord or cords can extend, and a slide received at least partially within the passage and which is movable relative to the cage between a locking position preventing movement of the cord or cords longitudinally in a predetermined direction relative to the device, and a released position permitting such movement. The passage in the cage has two opposite side walls defining a locking restriction which coacts with the slide to retain the cords against longitudinal movement when the slide is in its locking position. Usually, there are two cords (or two portions of the same cord) received at opposite sides of the slide, to be clamped tightly between the slide and the side walls of the passage in the locking position of the slide.

In some devices of this general type, means have been provided for automatically moving the slide to its locking position whenever a pulling force is exerted on the cords in a predetermined direction, and without the necessity for manually moving the slide to that locking position. For example, in U.S. Pat. No. 3,965,544, the slide has two gripping arms which are yieldingly urged away from one another and against two cords to always engage those cords and be moved by the cords toward locking position when the cords move in that direction. U.S. Pat. No. 4,156,574 shows an arrangement in which the slide has a main cord gripping portion and in addition has two spring fingers for engaging the cord to follow movements thereof. In another cord locking device which is on the market, the slide is a portion of a molded plastic part having a spring portion and an integral end element which is locked in fixed position within the cage of the device in a relation causing the slide to be yieldingly urged toward its active locking position, and thus attain a self locking action.

SUMMARY OF THE INVENTION

The general purpose of the present invention is to provide an improved self locking cord lock which is simpler, less expensive to manufacture, and easier to assemble or disassemble and operate than prior self locking devices. A cord lock embodying the invention includes a spring which yieldingly urges the body of the slide in a predetermined direction relative to the cage, toward the locking position of the slide in which a cord or cords are retained against longitudinal movement in that predetermined direction. The slide body is actuable manually in the opposite direction against the resistance of the spring to a released position permitting movement of the cord or cords in the first mentioned direction. The slide body has a handle portion projecting in the specified opposite direction beyond the spring and to the exterior of the cage, and which is adapted to be pulled by a user to move the slide body in that opposite direction relative to the cage against the resistance of the spring to release the cords for longitudinal movement.

The spring is preferably molded integrally with the body of the slide, and for best results is a resilient arm attached at one end to the slide body and having an opposite end portion applying yielding force to the cage to yieldingly urge the slide body toward the locking position. The spring arm is desirably formed as a bowed leaf spring, which may be received partially within an opening in the slide body and be bowed outwardly into an opening in a side wall of the cage. During assembly of the cord lock device, the slide body is inserted along an axis into the locking passage within the cage, with the bowed spring arm being deflectable to permit such insertion and returning by its resilience to a position preventing subsequent unwanted removal of the slide from the cage, and applying yielding self locking force in opposite directions to the cage and slide.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
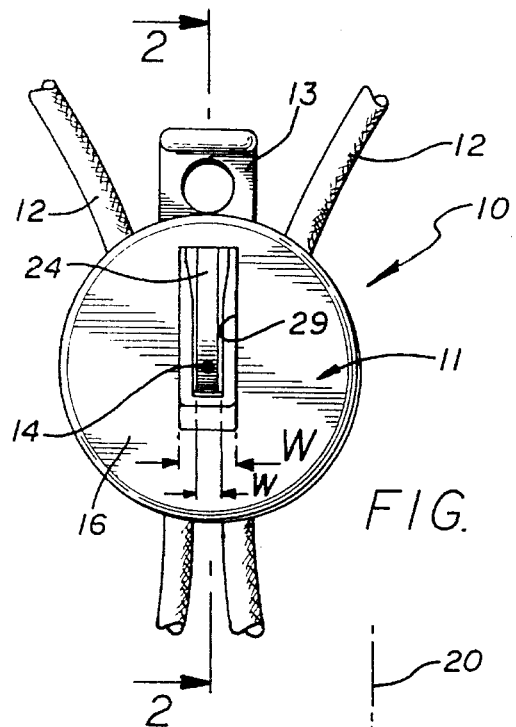
FIG. 1 is a front elevational view of a cord lock constructed in accordance with the invention.
Figure 2:
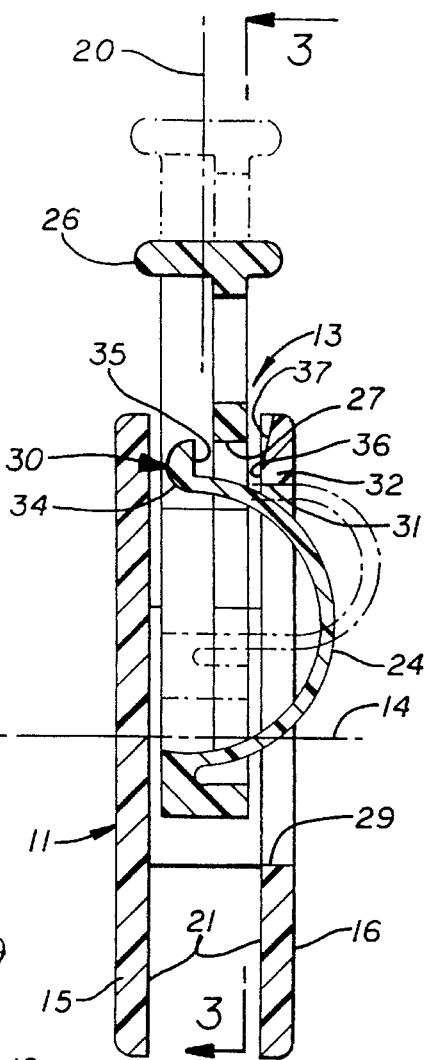
FIG. 2 is an enlarged central vertical section through the device, taken on line 2—2 of FIG. 1.
Figure 3:
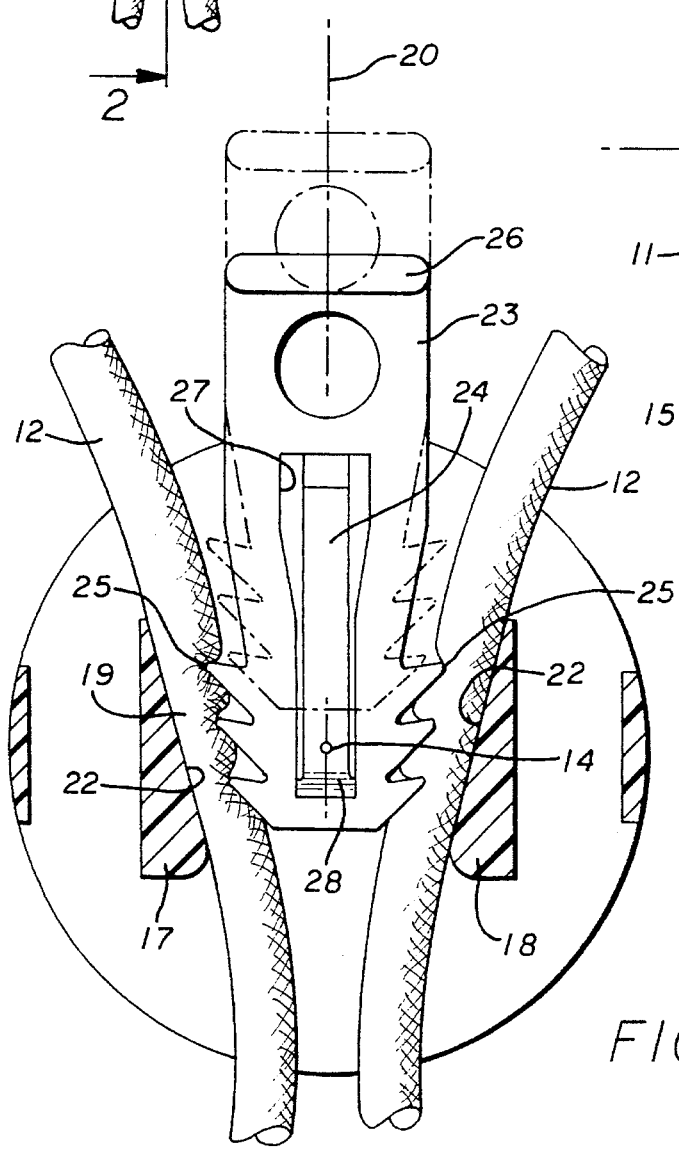
FIG. 3 is a section taken primarily on line 3—3 of FIG. 2.

Referring first to FIG. 1, the cord lock 10 there shown includes a cage 11 through which a cord or two cords 12 extend, with the cords being retainable against longitudinal movement in a predetermined direction (downwardly in FIG. 1) by a slide 13 received partially within the cage and projecting upwardly therefrom. The cage is molded of substantially rigid resinous plastic material, typically nylon, and is circular about an axis 14. As seen in FIG. 2, the cage has a planar rear wall 15 disposed perpendicular to axis 14 and externally circular about that axis, and has a similar front wall 16 also perpendicular to axis 14 and parallel to rear wall 15 and circular about the axis. As seen in FIGS. 2 and 3, the two walls 15 and 16 are molded integrally with and interconnected by two side walls 17 and 18 which define with the front and rear walls 15 and 16 a passage 19 through which cords 12 extend generally vertically, and within which slide 13 is partially received.

Passage 19 in the cage may be considered as extending along a vertical axis 20 perpendicular to and intersecting the previously mentioned axis 14. The inner surfaces 21 of cage walls 15 and 16 are parallel to one another and parallel to axis 20. The inner surfaces 22 of walls 17 and 18 of the cage converge toward one another as they advance downwardly, to form a locking restriction within which slide 13 clamps cords 12 against downward movement.

Slide 13, like cage 11, is molded of a resinous plastic material, typically nylon, and may be considered as having a rigid body portion 23 and a resiliently deformable spring arm portion 24. Portion 23 is given its desired rigidity by giving it sufficient cross section and bulk at all points to prevent substantial deformation of the body portion. The spring arm 24, on the other hand, is elongated and of a small enough cross section to enable the arm to be deformed resiliently and apply yielding force to the cage and portion 23 of the slide.

At its lower end, the rigid body portion 23 of the slide has two sets of gripping teeth 25 at its opposite sides facing laterally toward the converging inner surfaces 22 of walls 17 and 18 of the cage, to clamp the cords laterally between the teeth and walls 22 and against downward movement relative to the cage. As seen in FIG. 3, the two sets of teeth 25 gradually taper as they advance downwardly in correspondence with the taper of inner surfaces 22 of walls 17 and 18, to attain an optimum gripping action between the teeth and surfaces 22.

At its upper end, slide body 23 has a handle portion 26 which projects upwardly beyond spring arm 24 to the exterior of cage 11, so that this handle portion 26 can be grasped by a user to pull the slide body upwardly relative to the cage to a released position (broken lines in FIGS. 2 and 3) in which the teeth 25 no longer clamp the cords against surfaces 22, to thus permit downward movement of the cords within passage 19.

Spring arm 24 is received within a vertically elongated opening 27 formed in the rigid body portion 23 of the slide. The lower end 28 of spring arm 24 is molded integrally with and thereby attached directly to the lower end of slide body 23. The spring arm normally tends to return by its own resilience to the condition illustrated in full lines in FIG. 2. In that condition, the spring arm may have an essentially semi-circularly bowed configuration as seen in FIG. 2, to extend first laterally outwardly through an elongated opening 29 formed in the front wall 16 of the cage, and then laterally back into and through that opening and through the upper portion of opening 27 in the slide body to an upper free end 30 of the spring arm. As seen in FIG. 1, the spring arm has a width $w$ which is substantially less than the width $W$ of the vertically elongated preferably rectangular opening 29 in the front wall 16 of the cage, to allow lateral movement of the slide in a leftward or rightward direction relative to the cage far enough to permit the slide to simultaneously grip and lock two cords of different sizes at opposite sides of the slide, or grip a single cord at one side of the slide while engaging the cage surface 22 at the opposite side of the slide.

At the upper end of opening 29 in the front wall 16 of the cage, the material of that front wall forms a shoulder 31 which extends horizontally in the FIGS. 1 and 2 position of the device, and which may be the undersurface of a cross piece portion 32 of wall 16. The extremity 30 of the spring arm may have a rounded surface 34 as viewed in FIG. 2, for engagement with rear wall 15 of the cage. At its opposite side, the right side in FIG. 2, the upper extremity 30 of the spring arm may have a planar surface 35 disposed parallel to axis 20 and to an inner surface 36 of cross piece 32 of the front wall of the cage, to be engageable with surface 36 in a manner preventing the spring arm from being pulled out of opening 29. Above surface 36, cross piece 32 has an inner ramp surface 37 which is disposed at a camming angle with respect to vertical axis 20, to advance gradually rightwardly as it advances upwardly in FIG. 2.

To describe now the operation of the device, assume that slide 13 has been assembled into cage 11 in the position illustrated in FIGS. 1, 2 and 3, and that the two cords 12 extend downwardly at opposite sides of the slide as shown. In this condition, spring arm 24 of the slide engages the underside of cross piece 32 of the front wall 16 of the cage, to yieldingly urge the body 23 of the slide downwardly to the position illustrated in full lines in FIG. 3, in which position teeth 25 of the slide engage cords 12 to clamp them laterally against inner surfaces 22 of the cage. The spring arm thus acts to normally maintain the slide in this FIG. 3 position in which exertion of downward force on cords 12 automatically tends to pull slide 13 downwardly by virtue of the contact between teeth 25 and the cords, to thus attain a self locking action immediately and positively preventing downward movement of the cords. This locking action can be released by grasping the upper handle portion 26 of slide body 23 and manually pulling it upwardly along axis 20 relative to cage 11 and the cords and to the broken line position of FIGS. 2 and 3 in which teeth 25 of the slide are withdrawn upwardly far enough to permit the cords to move downwardly relative to the cage. This upward movement of the slide by actuation of the handle portion 26 is yieldingly resisted by spring arm 24, which during such upward movement of the slide assumes the increasingly bowed broken line condition of FIG. 2. When slide 13 is released, the resilience of spring arm 24 acting against cross piece 32 of the front wall 16 of the cage urges the slide body downwardly relative to the cage to the full line position of FIGS. 2 and 3, to reinstate the previously discussed automatic self locking action.

Figure 4:
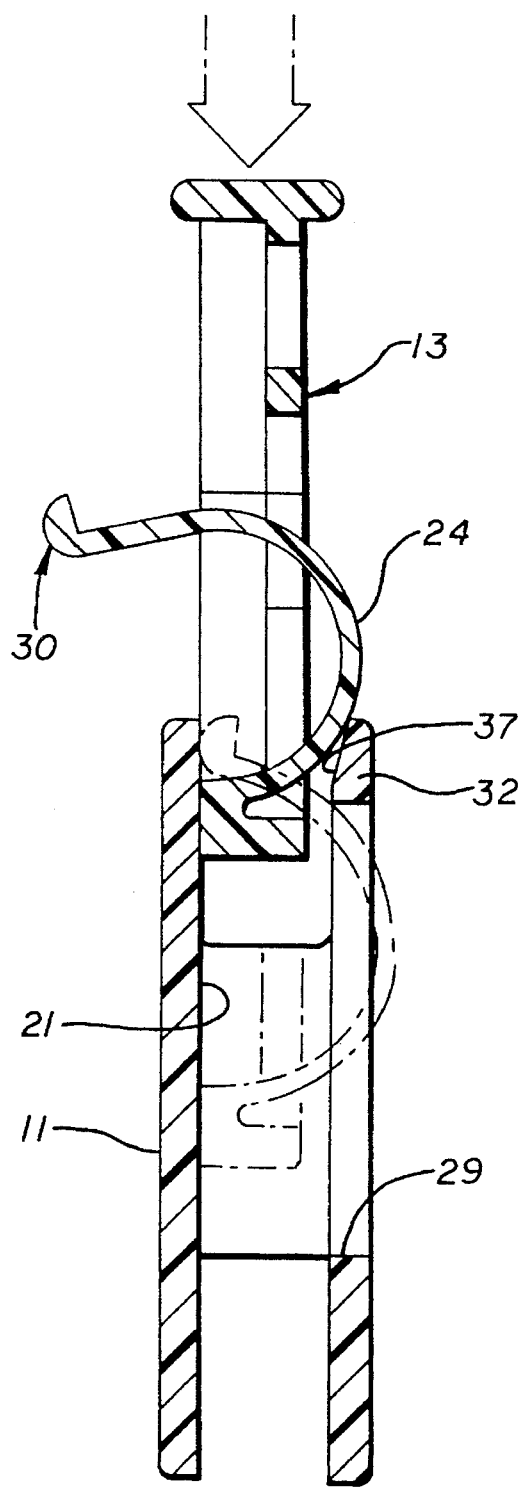
FIG. 4 is a view similar to FIG. 2, but showing the device during initial assembly of the slide into the cage.

FIG. 4 illustrates the manner in which the slide 13 may be initially inserted into cage 11. As seen in that figure, as the slide 13 is first moved downwardly into the cage, the lower portion of spring arm 24 engages cam surface 37 on cross piece 32 of the cage in a relation deflecting the spring arm leftwardly as seen in full lines in FIG. 4, so that the spring arm can pass cross piece 32 and move toward and into opening 29 in the front wall of the cage. Cross piece 32 may itself be slightly deflectable to the right by spring arm 24 relative to the remainder of the cage as the slide moves downwardly past the cross piece, to further facilitate assembly of the device. After arm 24 has passed the cross piece, the cross piece returns by its own resilience to the FIG. 2 condition.

After the major portion of spring arm 24 has passed cross piece 32 during assembly of the device, the free end 30 of arm 24 reaches a point of engagement with the upper edge of rear wall 15 of the cage, and is cammed rightwardly by that wall as represented in broken lines in FIG. 4, to engage and move downwardly along inner surface 21 of the rear wall of the cage, so that the spring arm can ultimately reach the installed full line position of FIG. 2. After reaching that position, the engagement of the spring with the undersurface of cross piece 32 of the cage prevents unwanted withdrawal of the slide from the cage, to thus maintain the device in assembled condition.

Figure 5:
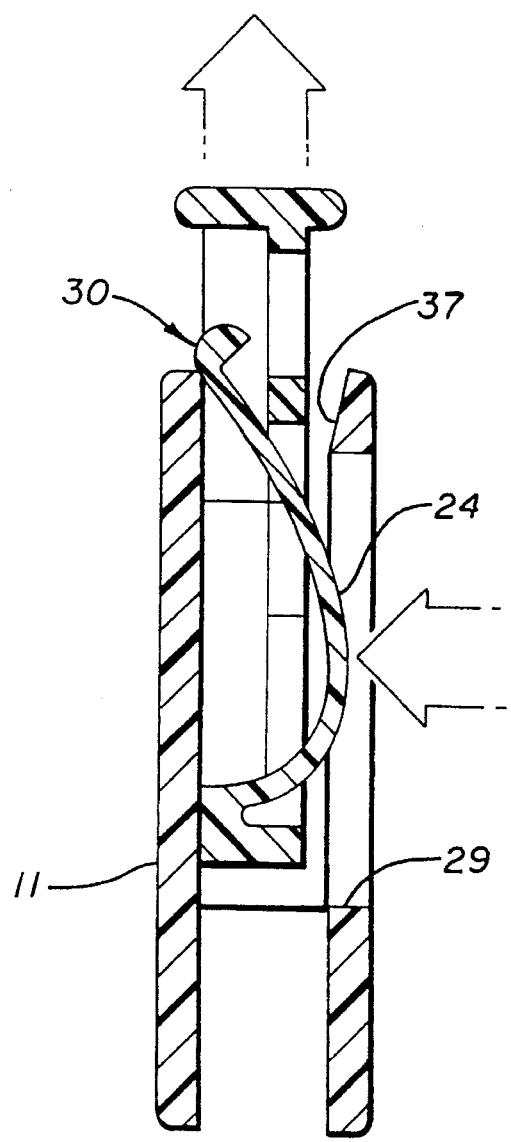
FIG. 5 shows the manner in which the spring portion of the slide may be manually pressed into the cage to permit removal of the slide from the cage.

If it is desired at any time to remove the slide from the cage, this may be attained by manually pressing the spring arm inwardly (leftwardly) through opening 29 in the cage wall to the position illustrated in FIG. 5, in which position the spring arm can move upwardly past crosspiece 32 as the slide is pulled upwardly from the cage.

while a certain specific embodiment of the present invention has been disclosed as typical, the invention is not limited to this particular form, but rather is applicable broadly to all such variations as fall within the scope of the appended claims.

I claim:

1. A cord lock comprising:

a cage containing a passage through which a cord or cords can extend and which forms a locking restriction;

a slide body received at least partially within said passage and which is movable relative to the cage between a locking position retaining the cord or cords against longitudinal movement in a predetermined direction and a released position permitting such movement;

said cage having a wall containing an opening at a side of said slide body; and a spring projecting from said slide body into said opening and engaging and bearing against a shoulder on said cage, and which yieldingly urges the slide body toward said locking position relative to the cage, and yieldingly resists movement of the slide body toward said released position.

2. A cord lock as recited in claim 1, in which said shoulder on the cage engaged by said spring is formed at an end of said opening in said cage wall.

3. A cord lock as recited in claim 1, in which said spring is deflectable by said cage upon initial insertion of the slide body into the cage to enable the spring to pass said shoulder and then move into said opening in said cage wall.

4. A cord lock as recited in claim 1, in which said spring is a resilient arm attached at a first end to the slide body and projecting to a free end of the arm, said free end having a shoulder surface engageable with a surface on the cage in a relation preventing the free end of the arm from being pulled laterally out of said opening in the cage wall.

5. A cord lock as recited in claim 1, in which said spring is manually depressible inwardly within said opening in said wall of the cage to a position permitting said spring to pass said shoulder for removal of the slide body from the cage.

6. A cord lock comprising:

a cage containing a passage through which a cord or cords can extend and having two opposite side walls defining a locking restriction;

a slide body received at least partially within said passage and which is movable in a first direction relative to said cage to a locking position retaining the cord or cords against movement in said first direction, and is movable in the opposite direction relative to the cage to a released position permitting movement of the cord or cords in said first direction; and a spring yieldingly urging said slide body in said first direction relative to the cage toward said locking position, and yieldingly resisting movement of the slide body toward said released position;

said slide body having a handle portion projecting in said opposite direction beyond said spring and to the exterior of said cage and which is adapted to be pulled by a user to move said slide body in said opposite direction relative to the cage to said released position against the resistance of said spring.

7. A cord lock as recited in claim 6, in which said spring is a resilient bowed arm attached at one end to said slide body and applying yielding force to a shoulder on said cage to yieldingly urge the slide body in said first direction relative to the cage.

8. A cord lock as recited in claim 7, in which said spring arm is deflectable by said cage to pass said shoulder upon initial insertion of the slide body into the cage.

9. A cord lock as recited in claim 6, in which said spring arm is manually deflectable relative to said cage to a position enabling withdrawal of the slide body from the cage.

10. A cord lock comprising:

a cage containing a passage through which a cord or cords can extend and having two opposite side walls defining a locking restriction;

a slide body received at least partially within said passage and which is movable in a first direction relative to said cage to a locking position retaining the cord or cords against movement in said first direction, and is movable in the opposite direction relative to the cage to a released position permitting movement of the cord or cords in said first direction;

said slide body containing an opening; and a bowed spring arm which is attached at one end to said slide body and is located at least partially within said opening in the slide body and bears against a shoulder on the cage, and which is resiliently deformable between said one end and said shoulder in a relation yieldingly urging the slide body toward said locking position relative to the cage, and yieldingly resisting movement of the slide body toward its released position.

11. A cord lock as recited in claim 10, in which said opening in the slide body is elongated, said spring arm being attached to said slide body near a first end of said opening and projecting in generally said opposite direction to a free end of the spring arm near a second end of the opening.

12. A cord lock comprising:

a cage containing a passage through which a cord or cords can extend and which forms a locking restriction;

a slide body received at least partially within said passage and which is movable relative to the cage between a locking position retaining the cord or cords against longitudinal movement in a predetermined direction and a released position permitting such movement;

said cage having a wall containing an opening at a side of said slide body; and a spring projecting from said slide body into said opening and engaging and bearing against a shoulder on said cage in a relation yieldingly urging the slide body toward said locking position relative to the cage;

said spring being a resilient arm attached to said slide body and bowed laterally outwardly into said opening in said wall of the cage.

13. A cord lock comprising:

a cage containing a passage through which a cord or cords can extend and which forms a locking restriction;

a slide body received at least partially within said passage and which is movable relative to the cage between a locking position retaining the cord or cords against longitudinal movement in a predetermined direction and a released position permitting such movement;

said cage having a wall containing an opening at a side of said slide body; and a spring projecting from said slide body into said opening and engaging and bearing against a shoulder on said cage in a relation yieldingly urging the slide body toward said locking position relative to the cage;

said spring being a resilient arm attached at a first end to said slide body and having a free end not directly attached to and movable relative to the slide body;

said resilient spring arm being bowed outwardly between said ends into said opening in said wall of the cage.

14. A cord lock comprising:

a cage containing a passage through which a cord or cords can extend and which forms a locking restriction;

a slide body received at least partially within said passage and which is movable relative to the cage between a locking position retaining the cord or cords against longitudinal movement in a predetermined direction and a released position permitting such movement;

said cage having a wall containing an opening at a side of said slide body; and a spring projecting from said slide body into said opening and engaging and bearing against a shoulder on said cage in a relation yieldingly urging the slide body toward said locking position relative to the cage;

said spring being a resilient arm attached at a first end to the slide body and projecting to a free end of the arm;

said free end having a rounded surface engaging an inner surface of the cage.

15. A cord lock comprising:

a cage containing a passage through which a cord or cords can extend and which forms a locking restriction;

a slide body received at least partially within said passage and which is movable relative to the cage between a locking position retaining the cord or cords against longitudinal movement in a predetermined direction and a released position permitting such movement;

said cage having a wall containing an opening at a side of said slide body; and a spring projecting from said slide body into said opening and engaging and bearing against a shoulder on said cage in a relation yieldingly urging the slide body toward said locking position relative to the cage;

said shoulder on the cage engaged by said spring being formed at an end of said opening in said cage wall;

said spring being a resilient arm attached at a first end to said slide body and having a free end not directly attached to and movable relative to the slide body;

said resilient spring arm being bowed outwardly between said ends into said opening in the side wall of the cage;

said spring arm being deflectable by said cage upon initial insertion of the slide body into the cage to enable the arm to pass said shoulder and then move outwardly into said opening in the cage wall.

16. A cord lock as recited in claim 15, in which said free end of the spring arm has a rounded surface engaging an inner surface of the cage, and has a shoulder surface engageable with a surface on the cage in a relation preventing the free end of the arm from being pulled laterally out of said opening in the cage wall.

17. A cord lock as recited in claim 16, in which said spring arm is manually depressible inwardly within said opening in said wall of the cage to a position permitting said spring arm to pass said shoulder for removal of the slide body from the cage.

18. A cord lock comprising:

a cage containing a passage through which a cord or cords can extend and having two opposite side walls defining a locking restriction;

a slide body received at least partially within said passage and which is movable in a first direction relative to said cage to a locking position retaining the cord or cords against movement in said first direction, and is movable in the opposite direction relative to the cage to a released position permitting movement of the cord or cords in said first direction; and a spring yieldingly urging said slide body in said first direction relative to the cage toward said locking position;

said slide body having a handle portion projecting in said opposite direction beyond said spring and to the exterior of said cage and which is adapted to be pulled by a user to move said slide body in said opposite direction relative to the cage to said released position against the resistance of said spring;

said slide body containing an opening, and said spring being a resilient bowed spring arm attached at one end to said slide body and movably received at least partially within said opening in the slide body.

19. A cord lock comprising:

a cage containing a passage through which a cord or cords can extend and having two opposite side walls defining a locking restriction;

a slide body received at least partially within said passage and which is movable in a first direction relative to said cage to a locking position retaining the cord or cords against movement in said first direction, and is movable in the opposite direction relative to the cage to a released position permitting movement of the cord or cords in said first direction; and a spring yieldingly urging said slide body in said first direction relative to the cage toward said locking position;

said slide body having a handle portion projecting in said opposite direction beyond said spring and to the exterior of said cage and which is adapted to be pulled by a user to move said slide body in said opposite direction relative to the cage to said released position against the resistance of said spring;

said slide body containing an opening;

said spring being a resilient bowed spring arm attached to said slide body near a first end of said opening and projecting in generally said opposite direction to a free end of the spring arm near a second end of said opening;

said spring arm being engageable with a shoulder on the cage near said free end of the spring arm to yieldingly urge the slide body in said first direction.

20. A cord lock comprising:

a cage containing a passage through which a cord or cords can extend and having two opposite side walls defining a locking restriction;

a slide body received at least partially within said passage and which is movable in a first direction relative to said cage to a locking position retaining the cord or cords against movement in said first direction, and is movable in the opposite direction relative to the cage to a released position permitting movement of the cord or cords in said first direction; and a spring yieldingly urging said slide body in said first direction relative to the cage toward said locking position;

said slide body having a handle portion projecting in said opposite direction beyond said spring and to the exterior of said cage and which is adapted to be pulled by a user to move said slide body in said opposite direction relative to the cage to said released position against the resistance of said spring;

said cage having an additional wall containing an opening at a side of the slide body, and said spring being a resilient spring arm attached at one end to said slide body and bowed outwardly into said opening in said additional wall of the cage.

21. A cord lock comprising:

a cage containing a passage through which a cord or cords can extend and having two opposite side walls defining a locking restriction;

a slide body received at least partially within said passage and which is movable in a first direction relative to said cage to a locking position retaining the cord or cords against movement in said first direction, and is movable in the opposite direction relative to the cage to a released position permitting movement of the cord or cords in said first direction; and a spring yieldingly urging said slide body in said first direction relative to the cage toward said locking position;

said slide body having a handle portion projecting in said opposite direction beyond said spring and to the exterior of said cage and which is adapted to be pulled by a user to move said slide body in said opposite direction relative to the cage to said released position against the resistance of said spring;

said slide body being movable essentially along an axis between said locking and released positions; said slide body containing an opening elongated essentially parallel to said axis, said spring being a bowed resilient spring arm attached integrally at one end to said slide body at a first end of said opening and projecting in generally said opposite direction to a free end of the spring arm near a second end of the elongated opening;

said cage having a shoulder engaged by the spring arm near said free end thereof in a relation yieldingly urging the slide body in said first direction relative to the cage and toward said locking position.

22. A cord lock as recited in claim 21, in which said cage has an additional wall containing an opening essentially opposite said opening in the slide body and within which said spring arm is bowed outwardly.

23. A cord lock comprising:

a cage containing a passage through which a cord or cords can extend and which forms a locking restriction;

a slide body received at least partially within said passage and which is movable relative to the cage between a locking position retaining the cord or cords against longitudinal movement in a predetermined direction and a released position permitting such movement; and a bowed spring having a first end acting against said slide body and a second end acting against said cage; said bowed spring following a generally arcuate progressively curving path between said ends thereof, and being resiliently deformable to conditions of different curvature between said ends, and acting by its resilience to yieldingly urge said slide body relative to the cage toward said locking position and yieldingly resist movement of the slide body toward said released position.

24. A cord lock as recited in claim 23, in which said bowed spring is attached at said first end thereof to said slide body, and said second end of the spring is not attached directly to and is movable relative to the slide body and bears against a shoulder on the cage.

* * * * *